June 5, 1962  J. B. KRAELING ETAL  3,037,804
ROTARY HOOK FOR TRAVELING BLOCK FOR CRANES
Filed Jan. 15, 1960  3 Sheets-Sheet 1

INVENTORS
JOHN B. KRAELING &
LAWRENCE H. COON
BY
William D. Carrothers

THEIR ATTORNEY

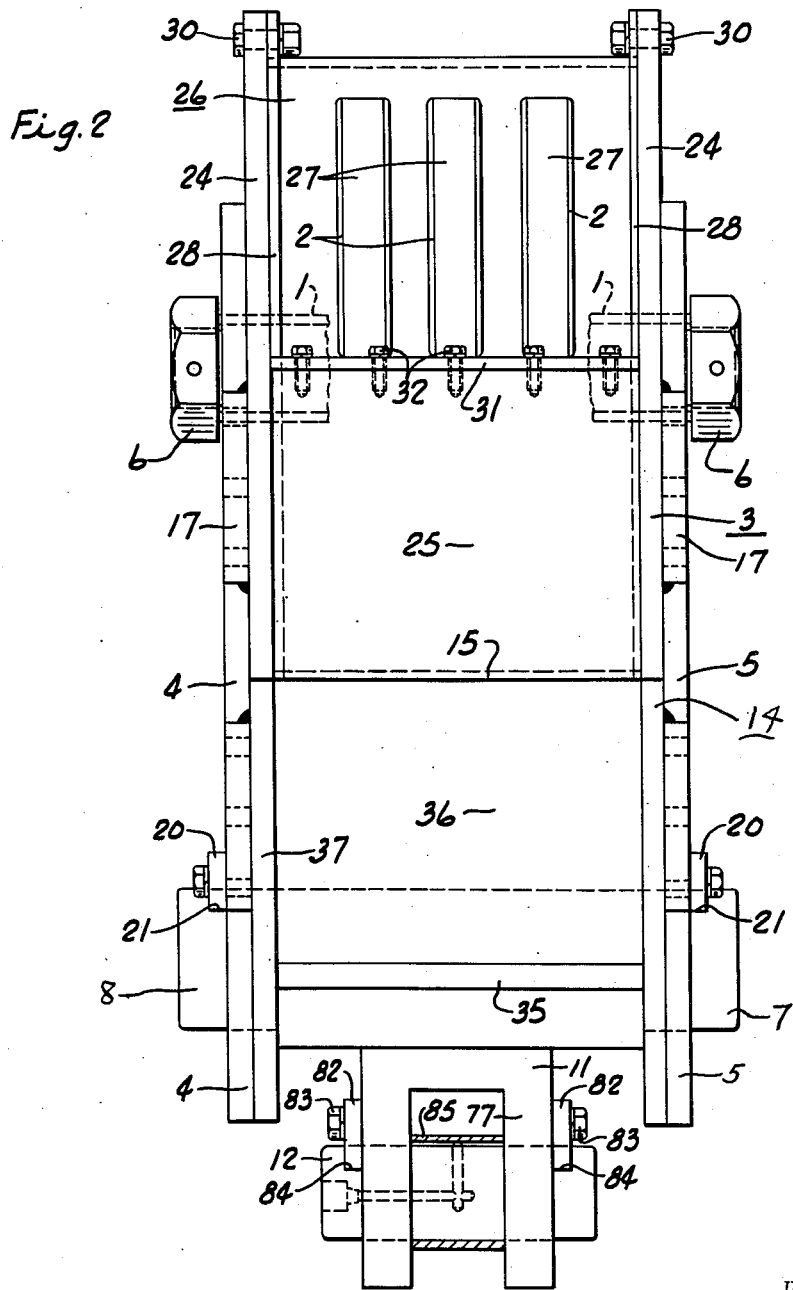

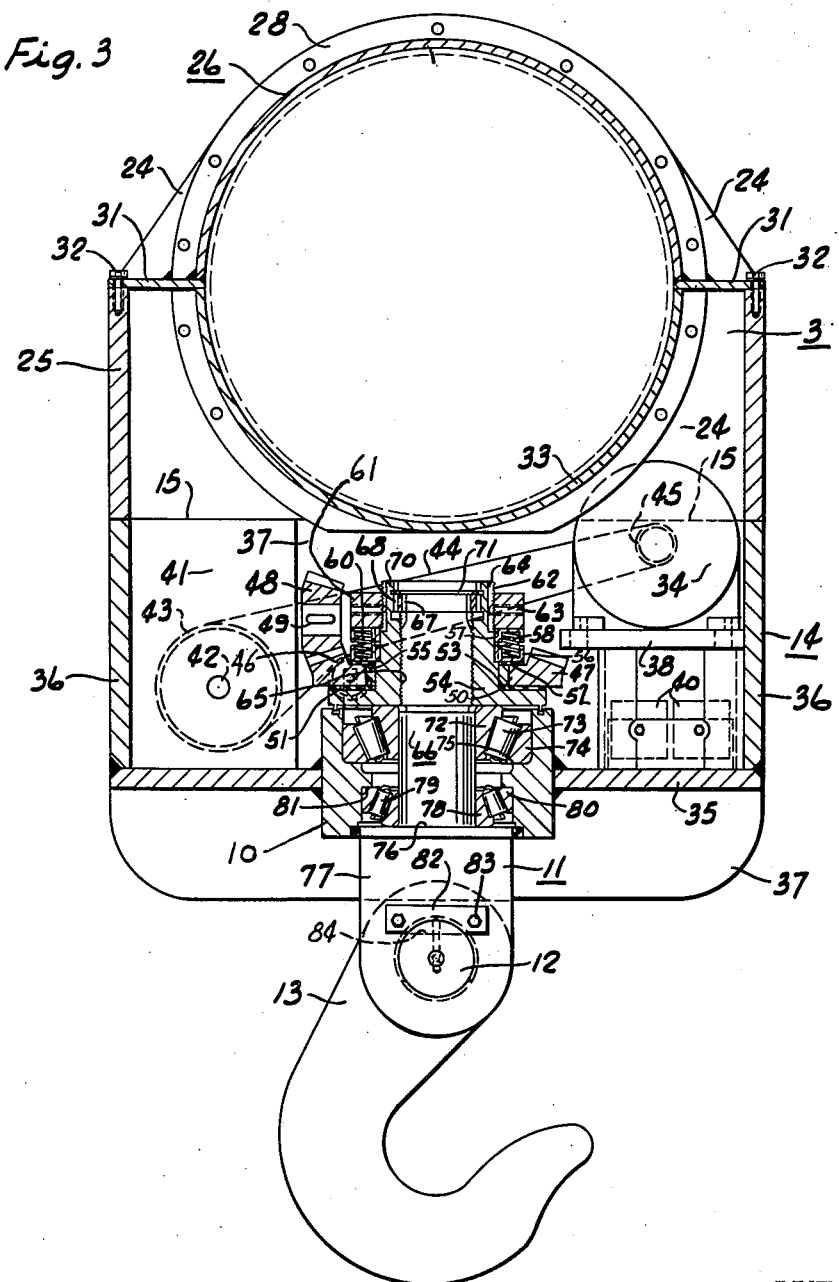

3,037,804
ROTARY HOOK FOR TRAVELING BLOCK FOR CRANES
John B. Kraeling, Meadville, and Lawrence H. Coon, Cochranton, Pa., assignors to Drafto Corporation, Cochranton, Pa., a corporation of Pennsylvania
Filed Jan. 15, 1960, Ser. No. 2,610
6 Claims. (Cl. 294—82)

This invention relates generally to traveling hook blocks and more particularly to hook block for cranes.

Crane hooks that are required to transport heavy loads in steel mills and the like are difficult to control owing to the fact that the load is difficult to swing even though the hook is suspended on antifrictional bearings. The ground men cannot turn the load with control lines and the operator ends up by pushing the load against any stationary object to turn the hook when the load requires orientation before unloading.

An object of this invention is the provision of an improved crane hook block made in two sections, one containing the sheaves and the other the hook swivel and secured to each other by means of parallel links. Each section is enclosed by independent housings to provide torsional rigidity between the upper and lower housings and the links. Opposed guides are provided between each link section and its adjacent housing with a lock wedge therebetween.

Another object is the provision of a rotary drive in the bottom housing to rotate said hook relative to the block to take up or discharge the load with proper orientation. This structure permits the separation of the lower portion of the block independently by the removal of the links if it is necessary to replace the same for repair. The sheaves in the upper portion usually last a long time and the crane need be out only for a short time to replace the same as a unit if something goes wrong with the drive for rotating the hook. This structure is mounted within the limits of the trunnion block and bearings which provides a structure balanced in weight and is confined within limited vertical height which does not add to the length of the block.

Another object is the provision of a friction clutch in the rotary drive of the hook to prevent destruction of the gear drive if the hook is accidentally struck against an object and caused to twist which will cause the clutch to slip rather than destroy the apparatus.

Another object is the provision of a positive interlocking between the hook nut and hook spindle to prevent the threads from being loosened by the rotary drive therebetween.

Another object is the provision of a D.C. motor in the hook drive and a rectifier connected therewith to control the reversal of the direction of rotation by reversing the polarity of two lines.

Other objects and advantages appear hereinafter in the following description and claims.

The accompanying drawings show for the purpose of exemplification without limiting the invention or claims thereto, certain practical embodiments illustrating the principles of this invention wherein:

FIG. 2 is a view in front elevation of the hook traveling block showing parts in section.

FIG. 3 is a view in vertical section of the traveling block as viewed in FIG. 1.

Figure 1:
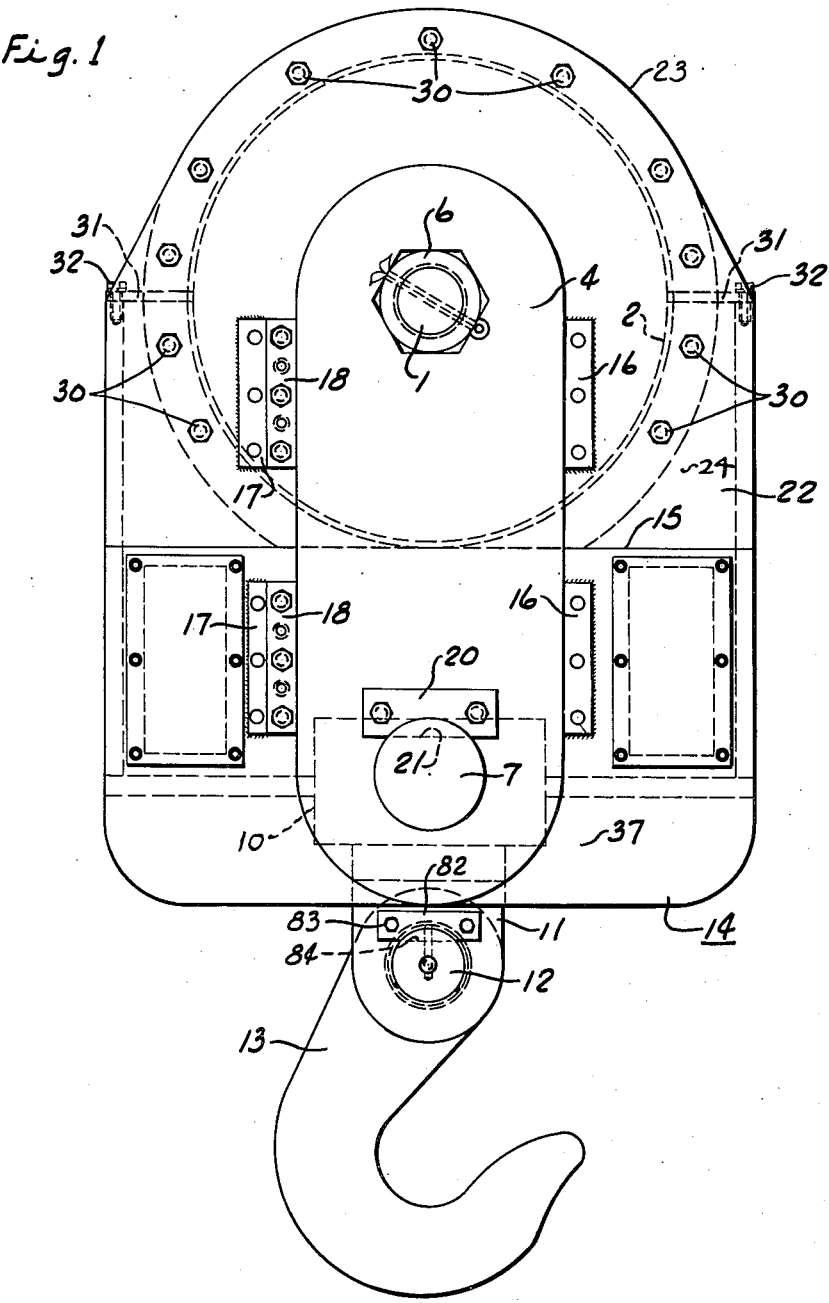
FIG. 1 is a view in side elevation of the hook traveling block comprising this invention.

Referring to the drawings the traveling hook block is made up of the sheave pin 1 having mounted thereon a plurality of sheaves 2 which are carried by antifrictional bearings on the sheave pin and which are provided with spacers to maintain their proper spaced relation along the pin and between the outer sheaves and the upper housing section 3.

On the outside of the housing the sheave pin 1 is provided with the links 4 and 5 which depend from the sheave pin 1 and are held in place by the nuts 6. The lower end of the links 4 and 5 have aligned openings to receive the trunnions 7 and 8 of the trunnion block 10. The trunnion block in turn supports the hook clevis 11 that carries the hook pin 12 that pivotally supports the hook 13 of the crane hook lock. The trunnion block 10 also carries the lower housing member 14 which abuts the upper housing 3 along the parting or dividing plane 15.

Each face of the housings 3 and 14 are provided with the guide plates 16 on one side of each link 4 and 5 which are finished along their inner edges to engage the finished edge of the links 4 and 5 and provide a tight fitting engagement therewith. Opposed to the guide blocks 16 are the wedge guide blocks 17. Each wedge guide block 17 likewise has a finished surface spaced from but opposed to the opposite finished edge of the links 4 and 5 and are arranged to receive the wedge blocks 18, the sides of which are likewise finished to be inserted in a tight fitting engagement between the wedge guides 17 and the finished side of the links 4 and 5 to tightly hold the housings 3 and 14 fixed relative to the links 4 and 5 and thereby avoid any torsional stress between the housings and their parts requiring the links to assume the whole of the supporting load as well as the torsional load. The guides are not only pinned to their respective housings but they are also welded to insure a very rigid and tight clamping force between each of the housing sections and the links 4 and 5. These torsional guide and wedge blocks are mounted on each side of the crane hook block so that both portions of the housing 3 and 14 are made rigid relative to both of the links 4 and 5.

Each of the trunnions 7 and 8 of the trunnion block 10 are interlocked with the links 4 and 5 by means of the keeper plates 20 which are bolted to the face of their housings and which are inserted in slots 21 in the trunnions.

As shown in FIG. 1, the housing 3 has a lower squared portion 22 which terminates at the parting plate 15. However, the upper portion is rounded as indicated at 23. The upper housing has the side plates 24 formed integral with the rectangular front and back plates 25. However, the upper arcuate portion has two removable sections 26 which take the shape of the side plates 24 and are provided with windows 27 for each of the sheaves 2. The top section 26 is also provided with a flange element 28 that bolts to the side plates 24 by the bolts indicated at 30 which are disposed on a semi-arcuate plane in the upper half of the housing section 3, the lower or integral housing section also carrying the same bolts as indicated in FIG. 1. The foot flange 31 is provided on each side of the housing or the cap member 26 and is secured to the lower section 25 by the bolts 32.

The mounting of the sheaves between spacers and on antifriction bearings does not form a part of this invention and therefore is not shown in detail. The lower section 25 of the upper housing 3 is sealed at the bottom by means of the arcuate plate 33. Thus the arcuate plate 33 and the flanges 31 completely enclose the upper portion of the housing section 3.

The lower portion of this housing is left open as shown in FIG. 3 to permit the upper portion of the motor 34 to extend therethrough. The lower housing section 14 is box shaped having a bottom member 35 welded to the front and back plates 36 and the side plates 37. These housing sections 3 and 14 are made so that they will meet at the parting line 15 when secured together by the links 4 and 5. This parting line is made sufficiently snug to prevent the dirt and other foreign materials from entering the housing. The motor 34 is mounted on the shelf 38 secured within the lower housing 14 and below this is shown two stacks of selenium or silicon rectifiers 40 which are employed in conjunction with the motor 34 which is a direct current motor or a universal motor operated on direct current. The rectifiers are placed in the circuit of either the field or the armature so that when the polarity is reversed to the two leads supplying direct current to the motor, the rectifier will maintain a constant direction of the current through either the field or the rotor depending upon which was chosen; and in this way one merely reverses the polarity of the two leads to reverse the direction of rotation of the motor and merely opens the line to stop the motor.

On the opposite side of the housing 14 as shown in FIG. 3, a gear reducer 41 is shown which has an input shaft 42 on which a double sprocket member 43 is secured and over which a double chain 44 travels from the sprocket 45 of the motor 34. An idler pulley 46 is employed to lift the chain 44 above the ring gear 47 which is rotated by the pinion 48 on the end of the output shaft 49 of the gear reducer 41. Thus rotation of the motor is materially reduced through the gear reducer 41 and is imparted by the pinion 48 to the ring gear 47.

The ring gear 47 has an annular body 50 with upper and lower flat faces that are engaged by a clutch lining mechanism 51 and 52. The lining 51 bears against the shoulder 53 of the hook nut 54. A spacer 55 is placed within the bore of the ring gear 47 and between the clutch linings 51 and 52. Pressure rings 56 and 57 are mounted on a smaller diameter section of the hook nut 54 and are provided with a series of opposed sockets 58 for receiving the springs 60. Some of these sockets may be provided with pins for maintaining alignment between the lower and upper rings 56 and 57. However, the rings are initially mounted so that the springs 60 are under sufficient compression to provide a friction drive between the upper and lower faces of the ring gear 47 and the friction clutch lining 51 and 52. A lock nut 61 is run on the outer threaded section 62 on the smallest outer diameter of the hook nut which lock nut is provided with radial holes that are threaded to receive the set screws 63 that are run into slots 64 in the threaded section 62 for checking the lock nut to maintain the proper pressure by the springs 60 on the clutch formed with the ring gear 47.

The bore of the hook nut 54 is threaded as indicated at 65 to be threadably received on the upper end of the spindle 66 of the hook clevis 11. The upper end of the threaded section of the spindle 66 is splined as indicated at 67 and the bore of the hook nut is enlarged and likewise splined as indicated at 68. A circular spline member 70 having inner and outer splined sections complementary to the splined sections 67 and 68 thus mesh therewith as an internal external gear for the purpose of providing a positive drive between the spindle 66 and the hook nut 54. This splined member 70 is held in place by the split ring 71. Thus the splined section 70 functions as a key between the spindle 66 and the hook nut 54.

The under side of the hook nut 54 rests on the inner race 72 of the tapered rollers 73, the outer race 74 of which is seated against the shoulder 75 in the bore of the trunnion block 10. The clevis 11 is also provided with a shoulder 76 with the bifurcated end 77 for supporting the inner race 78 carrying the rollers 79, the outer race 80 of which is supported against the opposing shoulder 81. The adjustment between these bearings is of course maintained by the hook nut 54 and once the proper adjustment is obtained the spindle 66 and the hook nut 54 are interlocked by the splined members 70. The bifurcated portion 77 of the clevis 11 carries the hook pin 12 which is locked to the clevis by means of the keeper plates 82. These keeper plates are held by the bolts 83 and are fitted in the slots 84 of the pin 12. The intermediate section of the pin has a sleeve bearing 85 on which the eye of the hook 13 rides.

Thus by reversing the two lines supplying the direct current to the motor 34 the pinion 48 is driven to turn the ring gear which will rotate the ring gear 47 and thus rotate the hook nut 54 and the clevis and the hook even though the same is carrying a very heavy load. However, if the crane is moving along and the hook or the load carried thereby strikes an object causing a sudden twist or turn of the hook and the load or the hook alone, the hook nut 54 will slip relative to the ring gear 47 and thereby prevent any injury to the train of gears within the gear reducer 41.

If for any reason the motor, the rectifiers or the gearing or any other portion of the device in the lower housing 14 becomes out of adjustment or requires replacement, the whole of the lower section of the housing 14 may be quickly dismantled from the block and another equivalent section attached thereto requiring the crane to be out of service only a short period of time, that is, a sufficient length of time to remove the links 4 and 5 and thus drop the lower housing 14 and replace the same with a new housing or a spare housing. This obviates the necessity of threading or not threading the sheaves and the sheave lines which takes considerable time as the crown sheaves are required to be unwoven and woven with the block sheaves which takes a considerably longer length of time and is ordinarily not necessary when servicing the rotary mechanism of the hook.

By having a rotary hook the load may be accurately positioned and avoids the danger of hurting the hooker-on and materially reduces the time in properly orienting the load to fit it into the scheme of production which is a material improvement and saves a considerable loss of time in production as well as for repairs.

We claim:

1. A crane hook block comprising a sheave pin, a plurality of sheaves mounted for rotation on said pin, a trunnion block having laterally extending trunnions, a hook, pivot means to secure said hook to said trunnion block, parallel links connected between said sheave pin and trunnions to support said hook from said sheaves, an upper housing including connected side and end walls and a top with windows for the sheave lines, said upper housing side walls supported on said sheave pin to enclose the upper portion of said crane hook block, and a lower housing including connected side and end walls and a bottom secured to said trunnion block, said lower housing and walls supported on said trunnion block to enclose the lower portion of said crane hook block, and said upper and lower housings being independent of each other, the open bottom of said top housing and the open top of said bottom housing meeting in mating engagement.

2. The crane hook block of claim 1 characterized by opposed parallel guides on each housing for each link, and block wedges locked to said guides and said links to maintain torsional rigidity of said housing and hook.

3. The crane hook of claim 1 characterized in that said pivot means includes bearing means on said trunnion block to pivotally support said hook to swivel on a vertical axis, a power drive mounted in said lower housing carried by said trunnion block to swing said hook in either direction about said vertical axis.

4. The crane hook of claim 3 characterized by mounting means to support said power drive including a motor on one side of said bearing means, and a gear reducer on the other side to limit the height of said pivot means.

5. The crane hook of claim 4 characterized in that said motor is a D.C. motor, a rectifier carried by said trunnion block and connected with said motor, and a circuit including a pair of leads connecting said motor and rectifier to reverse said motor.

6. The crane hook of claim 3 characterized in that said power drive includes a spindle and a hook nut thereon for supporting said hook on said bearing means, a direct connector consisting of a circular member splined inside and outside to connect between said spindle and said hook nut.

References Cited in the file of this patent

UNITED STATES PATENTS

| | | |
|---|---|---|
| 1,528,588 | Timbs | Mar. 3, 1925 |
| 1,577,283 | Mitchell | Mar. 16, 1926 |
| 2,071,499 | Clodfelter | Feb. 23, 1937 |
| 2,633,333 | Storm | Mar. 31, 1953 |
| 2,823,944 | Anderson et al. | Feb. 18, 1958 |